US00RE42970E

(19) United States
(12) Reissued Patent
Fournier et al.

(10) Patent Number: US RE42,970 E
(45) Date of Reissued Patent: Nov. 29, 2011

(54) VERTICAL CABLE MANAGEMENT SYSTEM

(75) Inventors: Steven O. Fournier, Southington, CT (US); William G. Sobieski, Guilford, CT (US); Robert C. Baxter, Warwick, RI (US)

(73) Assignee: Hubbell Incorporated, Shelton, CT (US)

(21) Appl. No.: 10/241,827

(22) Filed: Sep. 12, 2002

Related U.S. Patent Documents

Reissue of:
(64) Patent No.: 6,347,714
Issued: Feb. 19, 2002
Appl. No.: 09/465,839
Filed: Dec. 17, 1999

(51) Int. Cl.
*A47F 7/00* (2006.01)
(52) U.S. Cl. ..... 211/26
(58) Field of Classification Search ..... 211/26, 211/189; 361/829, 826, 727; 312/265.1, 312/265.2, 265.3, 265.4, 265.5, 265.6
See application file for complete search history.

(56) References Cited

U.S. PATENT DOCUMENTS 2,921,607 A * 1/1960 Caveney ..... 138/106
3,809,799 A * 5/1974 Taylor ..... 174/68.3
3,968,322 A * 7/1976 Taylor ..... 174/72 A
4,665,546 A 5/1987 Brey et al.
5,023,404 A 6/1991 Hudson et al.
5,326,934 A 7/1994 LeMaster et al.
5,586,012 A 12/1996 Lerman
5,765,698 A 6/1998 Bullivant
5,788,087 A 8/1998 Orlando
5,867,372 A 2/1999 Shie
5,902,961 A * 5/1999 Viklund et al. ..... 174/100
5,921,402 A 7/1999 Magenheimer
6,223,909 B1 5/2001 Mendoza
6,468,112 B1 * 10/2002 Follingstad et al. ..... 439/719

OTHER PUBLICATIONS

Hubbell Premise Wiring Catalog, prior to Dec. 1999, pp. 1, 90, 92-94 and 106.

* cited by examiner

*Primary Examiner* — Sarah Purol
(74) *Attorney, Agent, or Firm* — Alfred N. Goodman; Mark S. Bicks; Garrett V. Davis

(57) ABSTRACT

A cable management assembly for managing wires having a rack with a plurality of mounted channel members. The channel members each comprise a left, right, and middle member which form a Z-shaped cross section and define first and second receiving areas for holding a plurality of wires. The middle member further includes apertures such that a wire can be received concurrently in both receiving areas. The channel members are mounted on the rack by integrals clips that extend from each channel member and engage mating holes located on the rack. A second embodiment channel member includes a first member and an opposing second member each having integral clips extending therefrom for mounting the channel members on the rack. The channel member further has a middle member connecting the first and second members which form a C-shaped cross-section and define a receiving area for holding a plurality of wires.

53 Claims, 11 Drawing Sheets

VERTICAL CABLE MANAGEMENT SYSTEM

Matter enclosed in heavy brackets [ ] appears in the original patent but forms no part of this reissue specification; matter printed in italics indicates the additions made by reissue.

FIELD OF THE INVENTION

The present invention relates to a cable management assembly designed to manage and organize various wires. More specifically, the cable management assembly includes a channel that is Z-shaped in cross-section that mounts onto a relay rack through the use of integral clips, and has openings to permit wires to pass through the channel.

BACKGROUND OF THE INVENTION

Relay racks provide an efficient method of providing structure for a variety of cross-connect applications. The racks are typically used in a termination closet for the management of wiring systems such as telecommunication wiring systems. Employing a channel in conjunction with the relay rack facilitates the handling, routing, and organizing of things such as cable wires and optical fiber.

Current cable management assemblies include channels that are mounted on the sides of the relay rack. The channels hold bundles of wires that are connected to various cross-connect products held within the center of the relay rack. The channels are mounted by using nut and bolt type fasteners to couple the relay rack to the channels. In addition, nut and bolt type fasteners are commonly used to make any attachments to the channels, such as for securing covers over the front compartments of the channels. The requirement of employing nut and bolt type fasteners to secure the channels and the covers increases costs and creates inefficiency in securing and using the channels.

The design of the current channels creates additional problems. For example, more than one mold is required to form the channels thus increasing costs in making the channels. Also, channels are often broken in shipping and storage because they are not sufficiently durable. In addition, the design of the channel hinders loading and accessing wires in the front and rear compartments of the channel. Specifically, to load the wires in the front compartment, the cover and fasteners must be removed, and to load the wires in the rear compartment, the wires must be weaved through gates. Moreover, the covers and gates obstruct access to the wires in the front and rear compartments.

An additional problem is that the current channels fail to provide means for efficiently securing and organizing the numerous wires making it difficult for an operator to access the wires and the cross-connect products on the rack.

Examples of prior art cross-connect products are disclosed in U.S. Pat. Ser. No. 5,765,698 to Bullivant.

SUMMARY OF THE INVENTION

Accordingly, an object of this invention is to provide a cable management assembly with a channel that can be mounted to a relay rack without the use of separate fasteners.

Another object of this invention is to provide a channel that can receive a cover without the use of separate fasteners.

Another object of this invention is to provide a channel that is efficient and inexpensive to make and use.

A further object of this invention is to provide a channel that is durable, that can be formed using only one mold, and that facilitates access to the wires held in the channel.

Still another object of this invention is to provide a channel capable of efficiently securing and organizing the wires held in the channel.

Yet another object of this invention is to provide a cable management channel that can be ganged without the use of separate fasteners.

The foregoing objects are basically attained by a channel member comprising a first member having a first surface, a second surface, and a plurality of first fastening elements, and an opposing, second member having a third surface, a fourth surface, and a plurality of second fastening elements. The third surface of the second member is planar with the first surface of the first member, and the fourth surface of the second member is planar with the second surface of the first member. A middle member connects the second surface of the first member to the third surface of the second member forming a Z-shaped section transverse to the longitudinal axis of the first and second members. The middle member defines first and second receiving areas between the first and second members and has an aperture for providing access between the first and second receiving areas, such that a wire can be received concurrently in both the first and second receiving areas.

The foregoing objects are also attained by a rack assembly comprising a channel member for managing wires having, a one-piece first member with a first surface, a second surface, and an integral fastening element, and an opposing, second member with a third surface and a fourth surface. The third surface of the second member is planar with the first surface of the first member, and the fourth surface of the second member is planar with the second surface of the first member. A middle member connects the first member to the second member forming first and second receiving areas between the first and second members. A frame for supporting the channel member having a support element engaging the integral fastening element of the first member to support the channel member adjacent the frame.

The foregoing objects are also attained by a rack assembly comprising a first channel member for managing wires having, a one-piece first member with a first surface, a second surface, and an integral first fastening element extending from said first member, and an opposing, second member with a third surface, a fourth surface, and a second fastening element for engaging a cooperating first fastening element of a second channel member. The third surface of the second member is planar with the first surface of the first member, and the fourth surface of the second member is planar with the second surface of the first member, and a middle member connecting the first member to the second member forming first and second receiving areas between the first and second members, and having an aperture for providing access between the first and second receiving areas. A frame for supporting the first channel member, the frame having a support element engaging the first integral fastening element of the first member to support the first channel member adjacent the frame, such that a wire can be received concurrently in both the first and second receiving areas of the first channel member.

The foregoing objects are also attained by a rack assembly comprising a channel member for managing wires having a one-piece first member and an opposing, one-piece second member. The first and second members each having an integral fastening element extending therefrom respectively and a front surface. The channel member further having a middle member connecting the first member to the second member at a location opposite the front surfaces, forming a C-shaped section transverse to a longitudinal axis of the first and second members, the middle, first, and second members defining a receiving area for holding wires. A frame for supporting the channel member, the frame having a support element engaging the integral fastening element of the first member to support the channel member adjacent the frame.

The foregoing objects are also attained by a method for managing wires, comprising the steps of providing a bracket having opposing ends and a hanging element, and a channel member having an area for holding wires, fastening elements for receiving the ends of the bracket, and an engaging element for receiving the hanging element of the bracket. Storing the bracket on the channel member in a stored position such that the hanging element of the bracket is coupled to the engaging element of the channel member. Accessing the area for holding wires in the channel member. Removing the bracket from the stored position. Placing the bracket back on the channel member to hold the wires in the channel member such that the ends of the bracket are engaged with the fastening elements of the channel member.

Other objects, advantages and salient features of the invention will become apparent from the following detailed description, which taken in conjunction with the annexed drawings, discloses a preferred embodiment of the invention.

BRIEF DESCRIPTION OF THE DRAWINGS

Referring to the drawings which form a part of this disclosure.

DETAILED DESCRIPTION OF THE DRAWINGS

Figure 1:
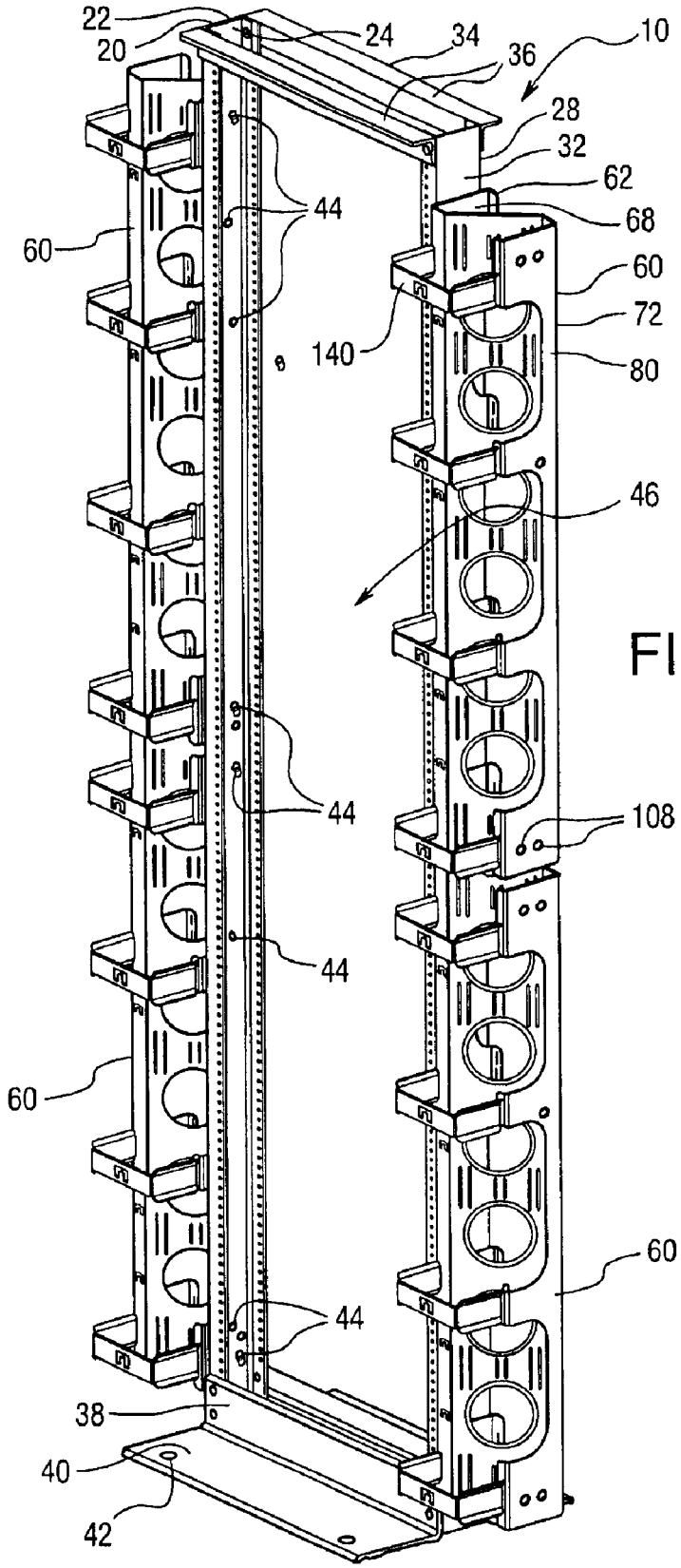
FIG. 1 is a top, front, right perspective view of a cable management assembly in accordance with the present invention showing a plurality of channel members mounted on the sides of a relay rack.
Figure 2:
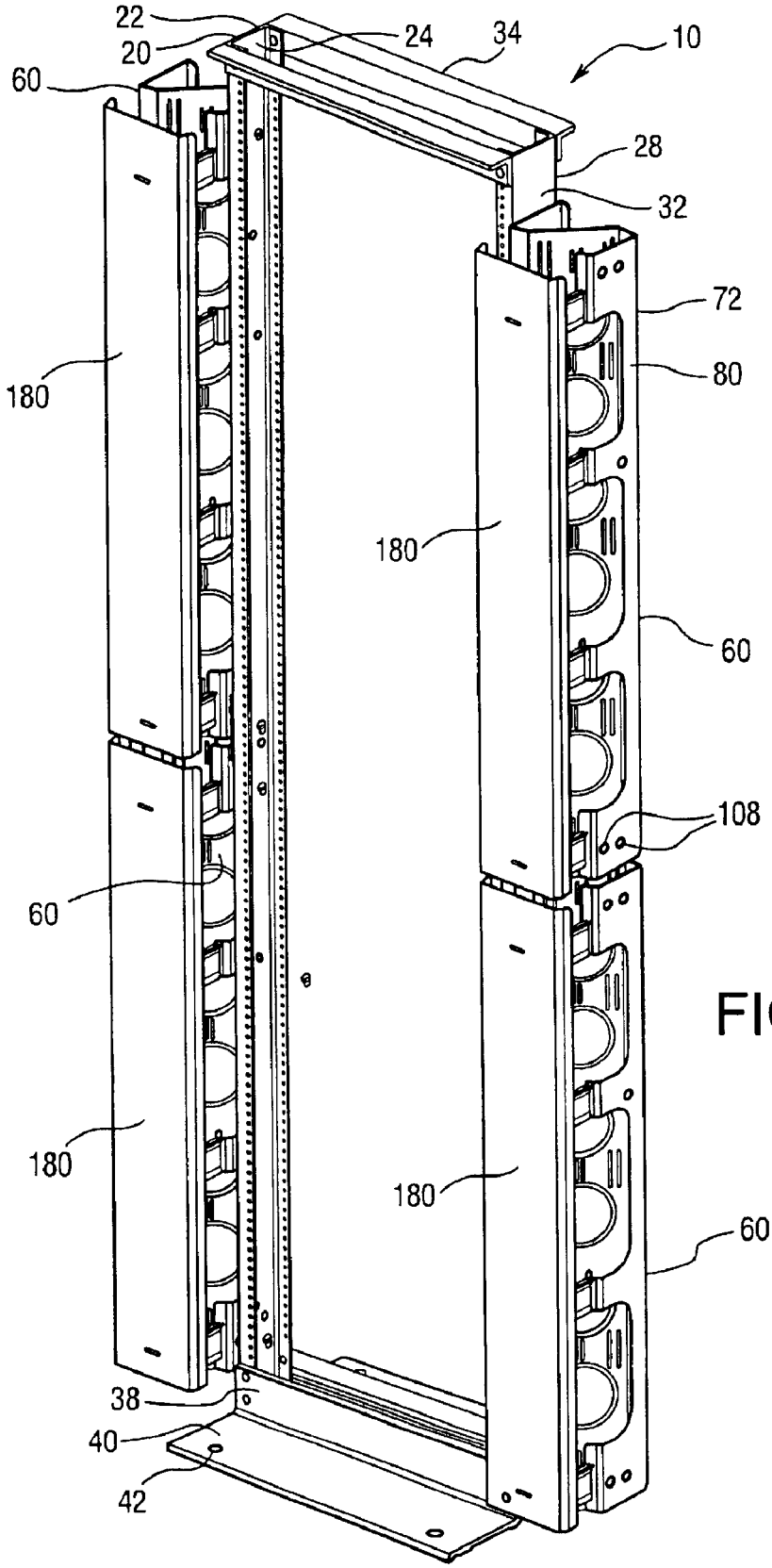
FIG. 2 is a top, front, right perspective view of the assembly illustrated in FIG. 1 and additionally showing the channels with covers.

Referring to FIGS. 1 and 2, a cable management assembly 10 according to the present invention is illustrated. The assembly 10 comprises a rack 20 having a plurality of Z-channel members 60 mounted thereon with gates 140 mounted on each Z-channel member 60 and covers 180 mounted on gates 140 covering Z-channel members 60.

As seen in FIGS. 1-4, Rack or frame 20 includes a left portion 22 with inner and outer surfaces 24 and 26 and a right portion 28 with inner and outer surfaces 30 and 32. Mating first through holes or support elements 44 for receiving integral clips 100 and 102 of Z-channel member 60, as discussed below, are disposed along both left and right portions 22 and 28. A plurality of mating holes 44 positioned along the length of portions 22 and 28 allow accommodation of different sized channel members. Top bracing portion 34 with outwardly extending support flanges 36 extends between left and right portions 22 and 28. Base portion 38 with outwardly extending support legs 40 extends between left and right portions 22 and 28. Support legs 40 support rack 20 and include holes 42 for receiving bolts for securing rack 20 to the floor. Top bracing portion 34 and base portion 38 are substantially perpendicular to left and right portions 22 and 28. Left and right portions 22 and 28 are typically U-shaped in cross-section and provide an attachment for a plurality of different cross-connect products (not shown) therebetween in central area 46 defined by inner surface 24 of left portion 22, top bracing portion 34, inner surface 30 of right portion, and base portion 38. An example of cross-connect product for attaching to rack 20 is disclosed in U.S. Pat. Ser. No. 5,765,698, which is incorporated herein by reference.

Channel members 60 are mounted on outer surfaces 26 and 32 of left and right portions 22 and 28, respectively. Wires 12 are held and organized in channel members 60 and can be connected to the cross-connect products held in central area 46. Although four channel members 60 are shown, both rack 20 and channel member 60 can be sized such that more or less than four channel members 60 can be used. Rack 20 is preferably made of a metal material but can be formed of any rigid material.

Figure 6:
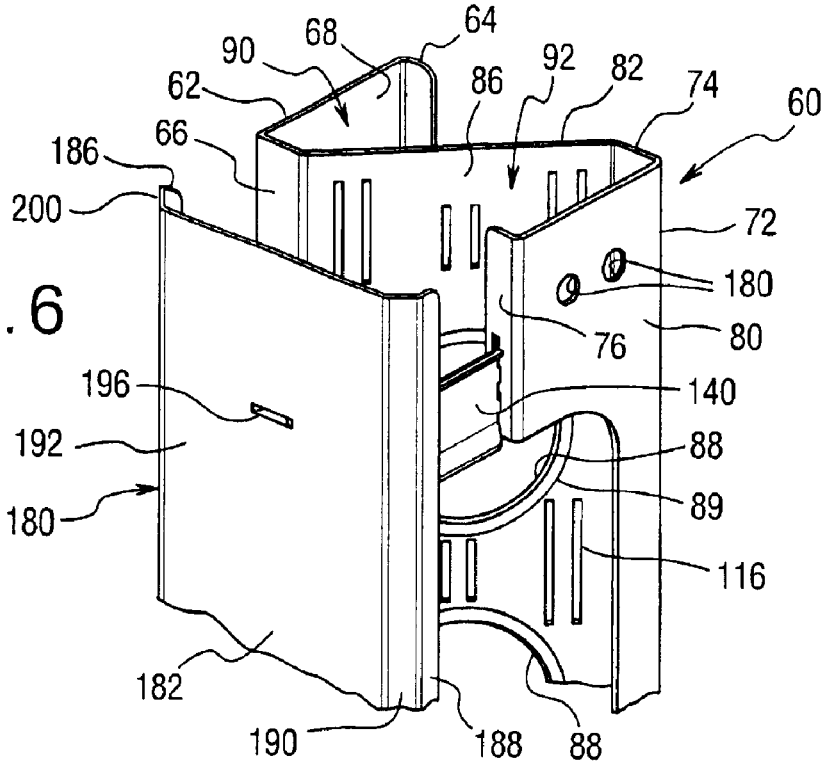
FIG. 6 is an enlarged, partial view of the channel member with the gate mounted thereto and with the cover mounted to the gate, in accordance with the present invention.
Figure 7:
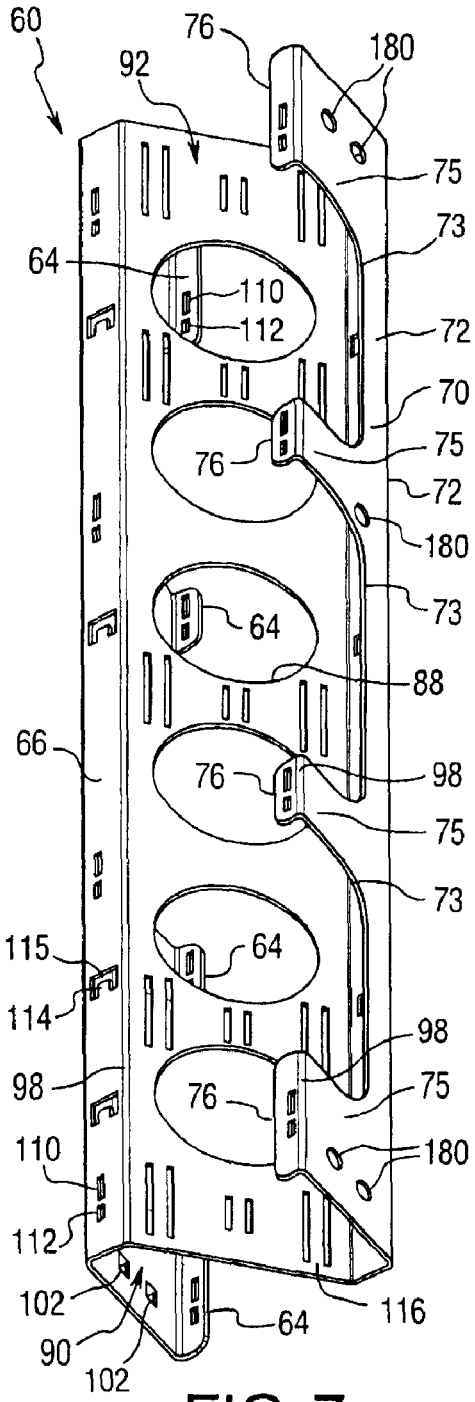
FIG. 7 is a bottom, front, side perspective view of the channel member, in accordance with the present invention.
Figure 8:
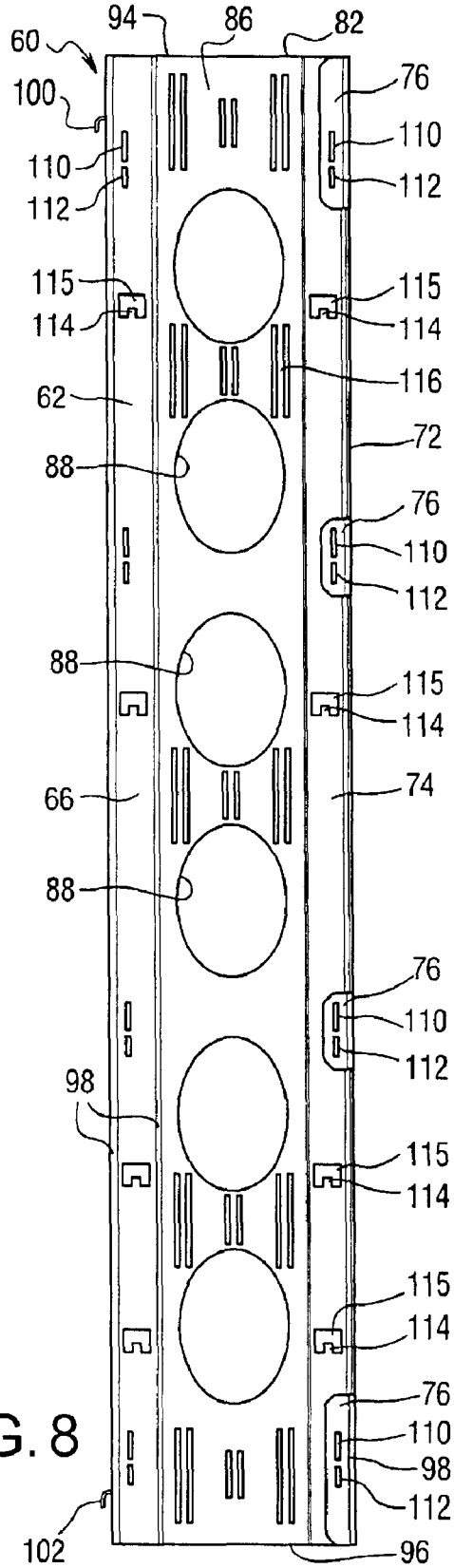
FIG. 8 is a front view of the channel member illustrated in FIG. 7.
Figure 9:
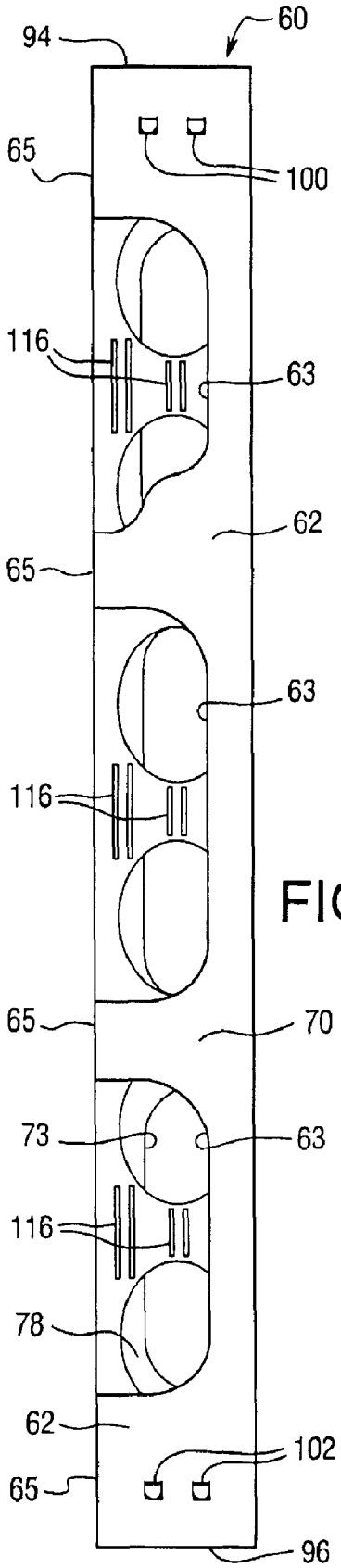
FIG. 9 is a left side view of the channel member illustrated in FIG. 7.
Figure 10:
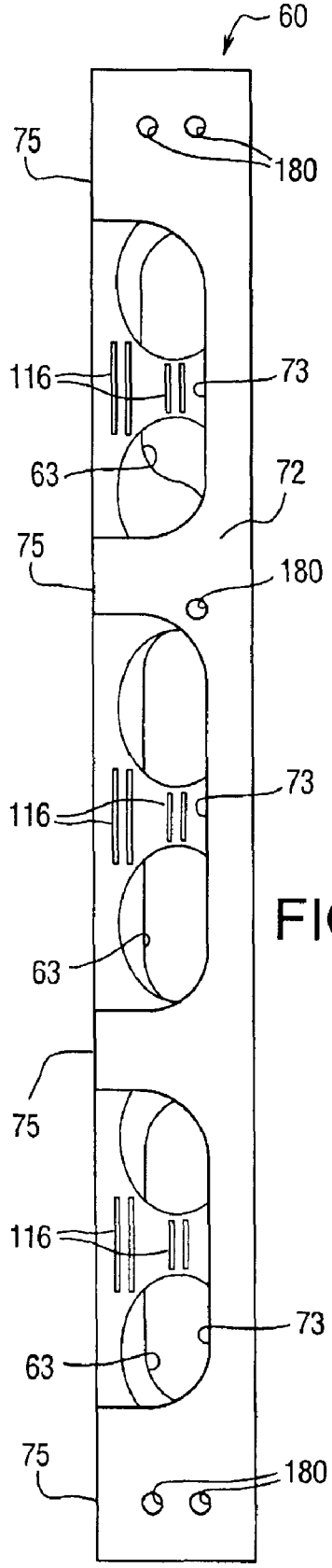
FIG. 10 is a right side view of the channel member illustrated in FIG. 7.

As seen in FIGS. 1-10, Z-channel or channel member 60 includes three elongated planar members, left or first member 62, right or second member 72, and middle member 82. The designations of "left" and "right" are with respect to channel member 60 as shown in FIGS. 8-10 and are for reference purposes only. Left member 62 has inner and outer surfaces 68 and 70, respectively, and a plurality of elongated cutouts 63 that form a plurality of segments 65. A plurality of rear walls or first surfaces 64 extend inwardly from inner surface 68 such that each rear wall 64 extends from each segment 65. Front wall or second surface 66 extends inwardly from inner surface 68 opposite rear walls 64.

Each rear wall 64 and front wall 66 are substantially perpendicular to left member 62. Right or second member 72 has inner and outer surfaces 78 and 80, respectively, and a plurality of elongated cutouts 73 that for a plurality of segments 75 similar to segments 65. A plurality of front walls or fourth surfaces 76 extend inwardly from inner surface 78 such that each front wall 76 extends from each segment 75. Rear wall or third surface 74 extends inwardly from inner surface 78 opposite front walls 76. Rear wall 74 and each front wall 76 are substantially perpendicular to right member 72. Rear walls 64 of left member 62 are substantially planar with rear wall 74 of right member 72. Front wall 66 of left member 62 is substantially planar with front walls 76 of right member 72. Preferably, front wall 66 and rear wall 74 are wider than front walls 76 and rears walls 64, however, they can be of various widths or the same width. Also, four rear walls 64 and four front walls 76 are shown where the two middle walls have a length approximately half of the length of the outer walls, as shown in FIG. 7. However, any number of rear and front walls 64 and 76 with varying lengths depending on the length of Z-channel member 60.

Figure 3:
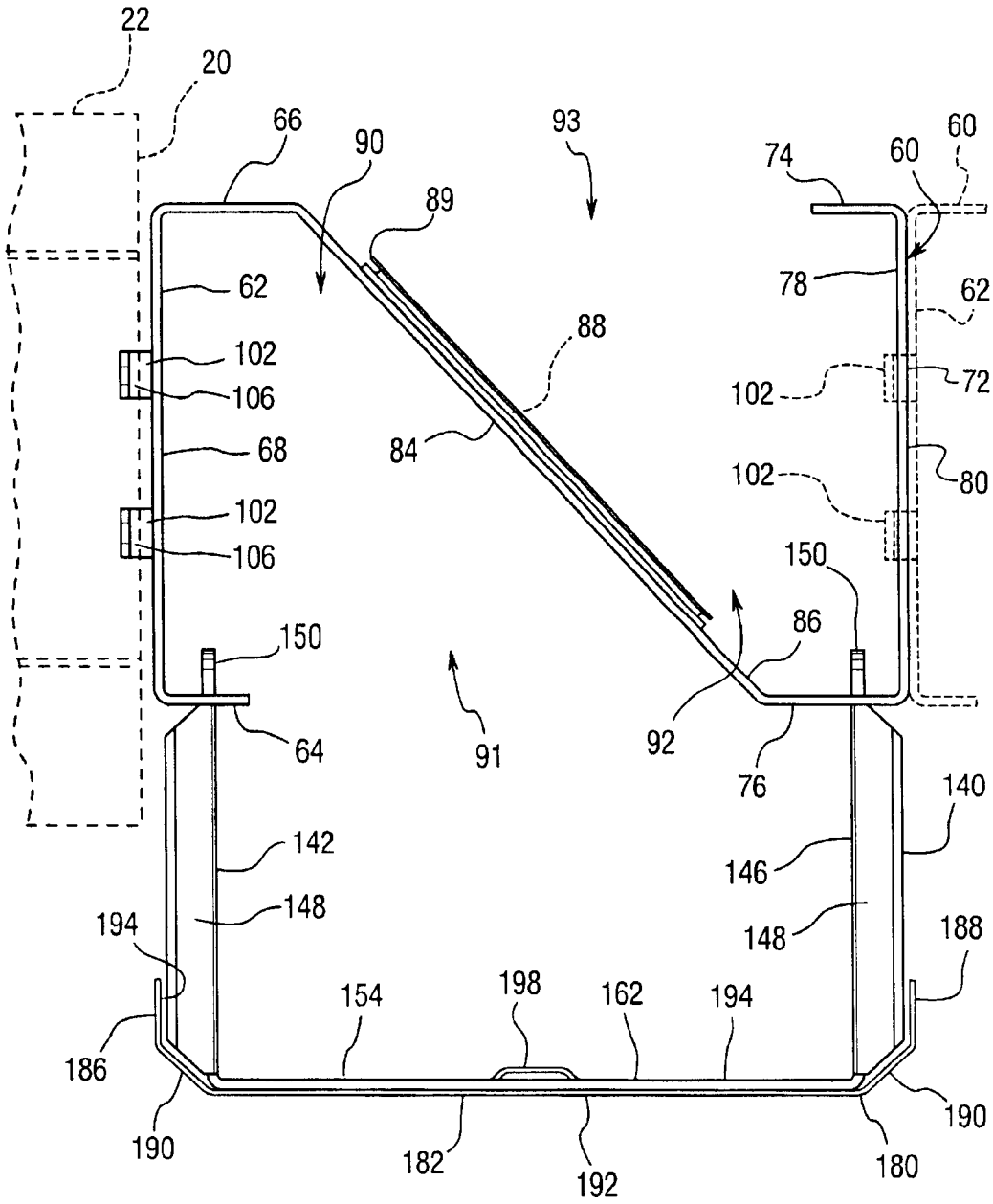
FIG. 3 is an enlarged, partial bottom view of the assembly illustrated in FIG. 2 showing a cover and a gate coupled to the left channel member, with the rack shown in dashed lines, and with a second, ganged channel member shown in dashed lines.

Middle member 82 has left and right surfaces 84 and 86 and extends from front wall 66 to rear wall 74. Middle member 82 connects left member 62 to right member 72 such that the cross section, a section transverse to the longitudinal axis of Z-channel member 60, is Z-shaped, as seen in FIG. 3. First receiving area 90 is defined between left surface 84 of middle member 82 and inner surface 68 of left member 62 and second receiving area 92 is defined between right surface 86 of middle member 82 and inner surface 78 of right member 72. First receiving area 90 has opening 91 that provides access therein for wires 12. Opening 91 is defined by the area between rear walls 64 and rear wall 74. Similarly, second receiving area 92 has opening 93 that provides access therein for wires 12. Opening 93 is defined by the area between front wall 66 and front walls 76.

Figure 4:
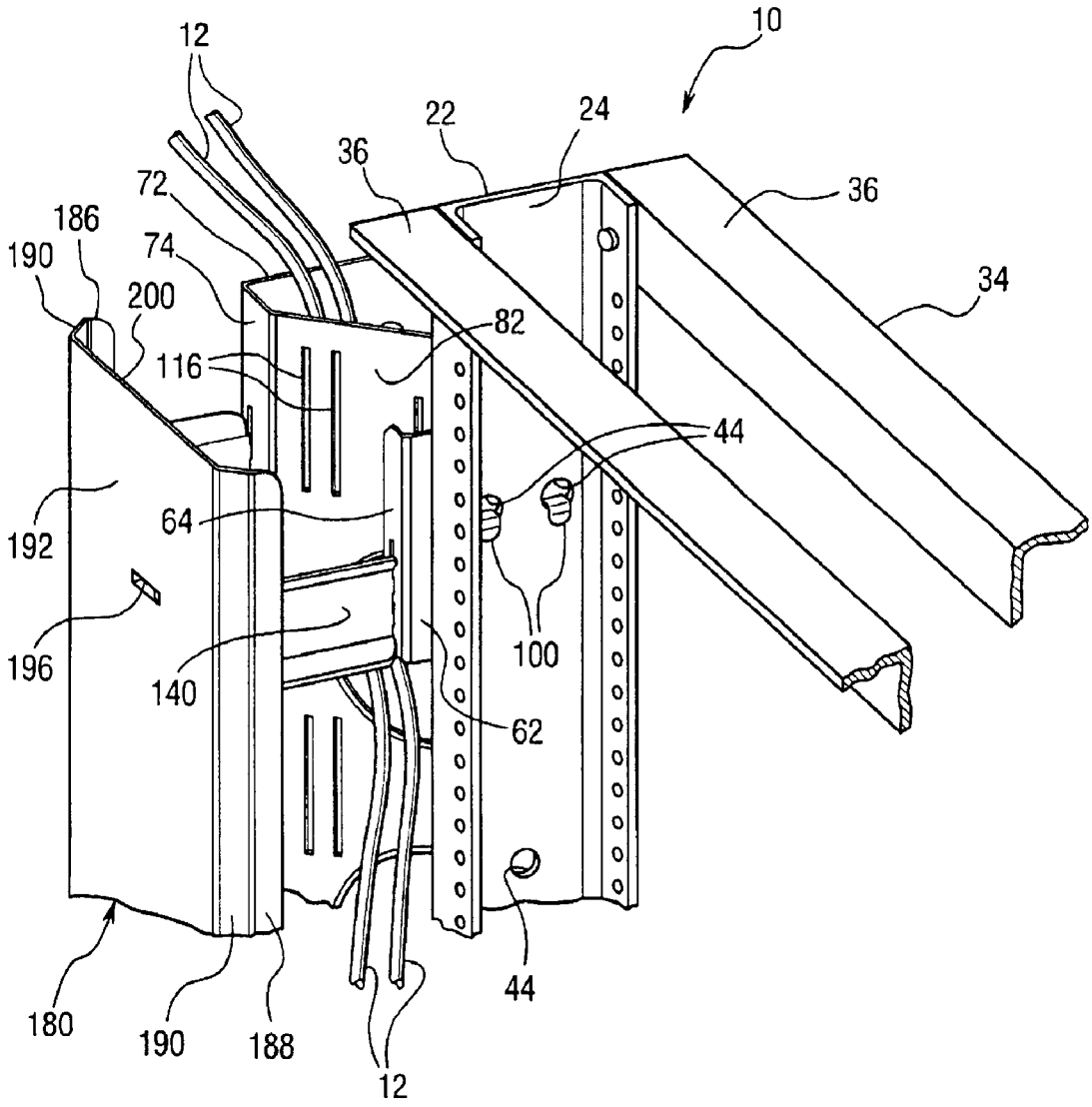
FIG. 4 is an enlarged, partial view of the assembly illustrated in FIG. 2 showing the left channel member mounted on the rack by integral clips, and a gate and a cover attached to the left channel member.

Apertures 88, each with outer lip 89, are preferably evenly disposed along middle member 82 and provide access for wires 12 between first and second receiving areas 90 and 92. Although shown as generally circular, apertures 88 can be of any shape, such as square or oval. In addition, only one aperture 88 need be employed as long as first receiving area 90 can be accessed by second receiving area 92, and second receiving area 92 can be accessed by first receiving area 90. Wires 12 can be vertically received in both first and second receiving areas 90 and 92 such that one wire 12 can be concurrently received in both first and second receiving areas 90 and 92 through apertures 88, as seen in FIG. 4.

Z-channel member 60 further has top edge 94, bottom edge 96 and beveled side edges 98 connecting middle member 82 to front and rear wall 66 and 74, connecting rear walls 64 and front wall 66 to left member 62, and connecting rear wall 74 and front walls 76 to right member 72. It is preferred that Z-channel member be formed of metal material but it may be formed of a lighter weight material such as plastic.

Top and bottom integral clips, or fastening elements, 100 and 102 are disposed on left member 62 proximate top and bottom edge 94 and 96, respectively. Clips 100 and 102 are formed by punching out a small section of left member 62 and extend outwardly from outer surface 70. Although pairs of clips 100 and 102 are shown, it will be understood that any number of clips 100 and 102 can be used as long as they correspond to mating holes 44 of rack 20. As seen in FIG. 4, clips 100 and 102 are downwardly curved and tapered at the end to create a hook for securely mounting Z-channel member 60 on rack 20. To mount channel member 60 on rack 20, top and bottom clips 100 and 102 are inserted into corresponding mating holes 44 of rack 20 that are sized to accommodate clips 100 and 102 such that bottom surfaces 106 of clips 100 and 102 rest on bottom portions of the mating holes 44 to fully support channel 60 on rack 20. Clips 100 and 102 are sufficiently strong to support any wire attached to channel 60 as well.

Channel member 60 is designed such that the same channel member 60 can be mounted on either left portion 22 or right portion 28 of rack 20. This design reduces costs by requiring only one mold to be used to make channel members 60 eliminating the necessity of two different molds, one to accommodate the left portion 22 and one to accommodate the right portion 28. However, left, right, and middle members 62, 72 and 82 can be formed separately and then connected by any known attachment means.

To mount Z-channel member on right portion 28 of rack 20, top integral clips 100 are inserted into mating holes 44 proximate top bracing portion 34 of rack 20, and bottom integral clips 102 are inserted into mating holes 44 located near a mid-section of rack 20, as seen in FIG. 1. When Z-channel member 60 is mounted on right portion 28, outer surface 70 of left member 62 is adjacent to outer surface 32 of right portion 28, front wall 66 faces frontwardly providing access to second receiving area 92 from the front, and rear wall 74 faces rearwardly providing access to first receiving area 90 from the rear. To mount Z-channel member 60 on left potion 22 of rack 20, Z-channel member 60 must be rotated 180-degrees around its longitudinal axis such that outer surface 70 of left member 62 is adjacent outer surface 26 of left portion 22 of rack 20. Z-channel member 60 is mounted on left portion 22 in the same fashion as described above with respect to right portion 28. When S-channel member 60 is mounted on left portion 22, rear wall 74 faces frontwardly providing access to first receiving area 90 from the front and front wall 66 faces rearwardly providing access to second receiving area 92 from the rear. It will be understood that Z-channel members 60 can be made of various lengths depending on the number of channels desired and the size of rack 20.

As seen in FIG. 7, mating holes, or fastening elements, 108 are located on the right member 72 in locations corresponding to the location of top and bottom clips 100 and 102 on left member 62. Mating or second holes 108 allow more than one channel member 60 to be ganged together by inserting integral clips 100 and 102 of a second channel member 60 (not shown) with the mating holes 108 of a first channel member 60. FIG. 3 shows a second channel member 60 (partially) in dashed lines ganged to another channel 60 shown in solid lines. Upon ganging the first and second channels 60 together, outer surface 80 of right member 72 of the first channel member 60 is adjacent to outer surface 70 of left member 62 of the second channel member. This provides the ability to accommodate more wires using only one rack 20 and a plurality of successively ganged channel members 60. The number of ganged channel members 60 can be determined by the user.

In addition, two or more channel members 60 can be ganged between more than one rack 20 (not shown). Upon mounting a first channel member 60 on right portion 28 of a first rack 20, a second channel member 60 can then be coupled with the first channel member 60 by fastening together corresponding mating holes 108 located on right member 72 of each first and second channel members 60 such that front wall 66 of the first channel member 60 faces forwardly and front wall 66 of the second channel member 60 faces rearwardly. Typically, nut and bolt type fasteners are employed to couple first and second channel members 60 together. This allows second channel member 60 to be coupled with a second rack 20 by inserting clips 100 and 102 of the second channel member 60 into corresponding mating holes 44 of left portion 22 of second rack 20.

Z-channel member includes pairs of first and second slots, or fastening elements, 110 and 112 that are evenly disposed on front wall 66 and rear wall 74. Pairs of slots 110 and 112 are also disposed on each front and rear walls 64 and 76. The location of slots 110 and 112 on front wall 66 correspond to the location of slots 110 and 112 on front walls 76. Similarly, the location of slots 110 and 112 on rear wall 74 correspond to the location of slots 110 and 112 on rear walls 64. Gates, or brackets, 140 can then be received in each corresponding pairs of slots, as seen in FIGS. 5-8. The number of pairs of slots 110 and 112 to be utilized can vary depending on the number of front walls 76 and rear walls 64 employed, however, it will be understood that only two pairs of corresponding slots are necessary. Tongue or engaging elements 114 are also disposed on front wall 66 and rear wall 74 for storing gates 140 and are formed by U-shaped cutouts 115. Although four tongue elements 114 are shown, any number of tongues elements 114 can be used. Elongated slots 116 are vertically disposed on middle member 82 as seen FIGS. 7 and 8. Slots 116 allow straps, typically VELCRO, to be inserted through the slots 116 and wrapped around wires 12, facilitating the bundling and organization of wires 12.

As seen in FIGS. 1-12, cable management assembly 10 includes gates 140 that are mounted on Z-channel member 60 for enclosing wires 12. Gates 140 can be mounted on both the front and the rear of Z-channel member 60. Gate 140 includes left and right end walls 142 and 146 connected to middle wall 154 with an inner and outer perimeter 162 and 164. Each end wall 142 and 146 includes two outwardly extending curved side flanges 148 and first and second foot members 150 and 152 for engaging first and second slots 110 and 112 of Z-channel member 60. Foot members 150 and 152 extend from distal ends 149 of each end wall 142 and 146 by extensions 153 where foot member 150 is adapted to fit first slot 110 and second foot member 152 is adapted to fit second slot 112. Middle wall 154 extends between left and right end walls 142 and 146 connected by curved edges 160 and includes support ribs 158 which are disposed on the inner surface of middle wall 154 and extend the entire length of middle wall 154. Tongue or cover receiving element 156 is centrally located on middle wall 154 and is formed by a U-shaped cutout 157.

Figure 5:
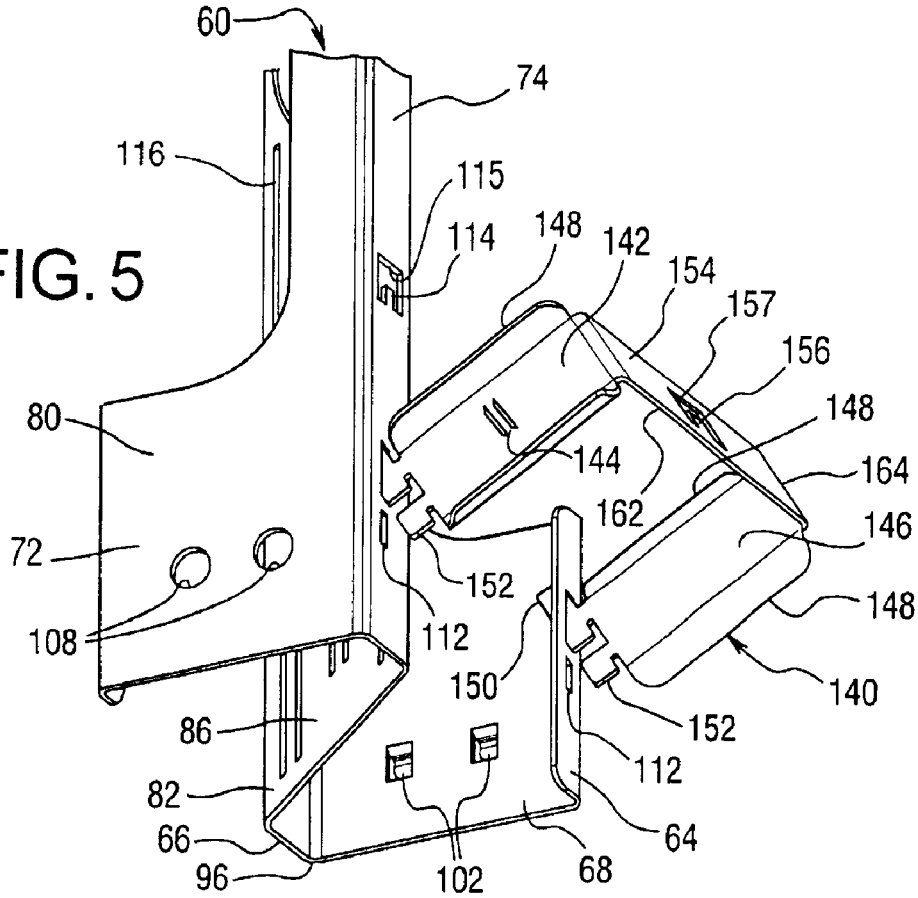
FIG. 5 is an enlarged, partial view of the gate being coupled to the channel member, in accordance with the present invention.

As seen in FIG. 5, gate 140 is mounted on Z-channel member 60 by first inserting first foot member 150 into first slot 110 at an angle and subsequently rotating gate 140 downwardly such that second foot member 152 is inserted into second slot 112. Upon being inserted, extensions 153 of each foot member 150 and 152 rest on bottom portions of slots 110 and 112, respectively. Once mounted, gates 140 act to enclose wires 12 in first and second receiving areas 90 and 92 by providing a bracket across openings 91 and 93 of first and second receiving areas 90 and 92, respectively, such that wires 12 are disposed in and between receiving areas 90 and 92 and inner perimeter 162 of gates 140. To remove gate 140 from Z-channel member 60, gate 140 is lifted slightly and rotated upwardly such that second foot member 152 is disengaged from second slot 112, allowing first foot member 150 to be pulled out of engagement with first slot 110.

Figure 11:
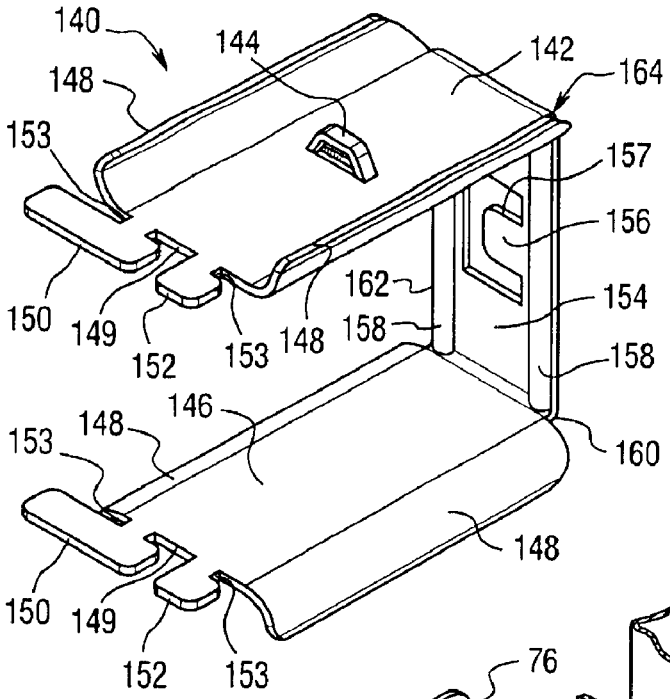
FIG. 11 is a bottom, rear, left side perspective view of the gate in accordance with the present invention.
Figure 12:
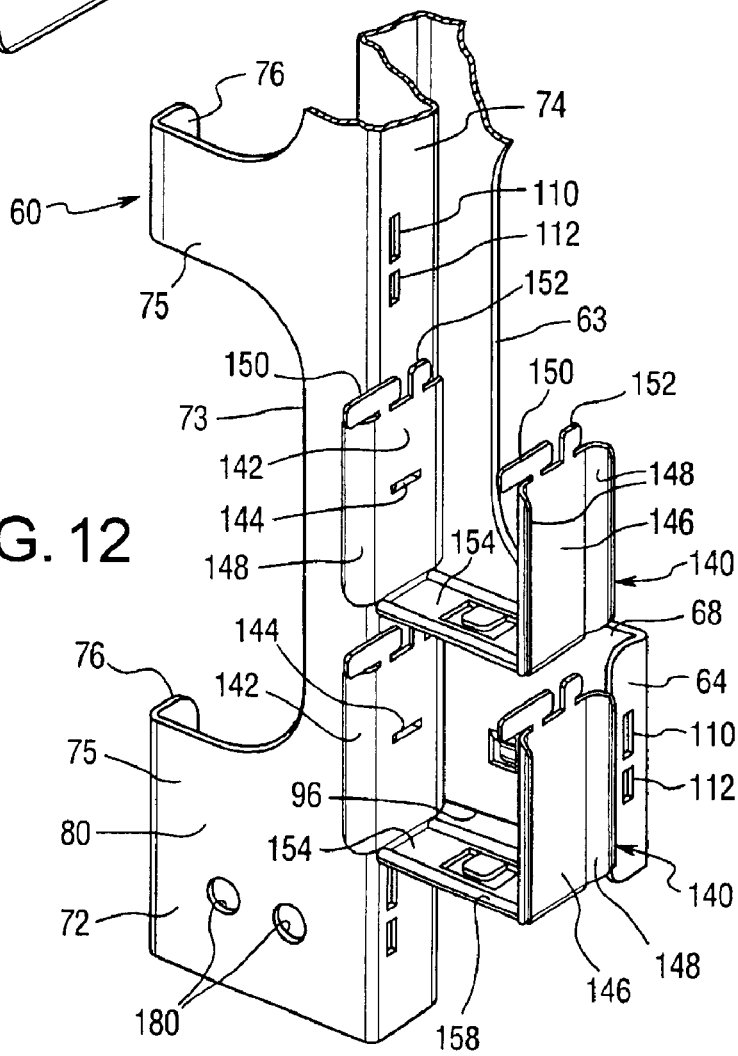
FIG. 12 is a top, front, left side perspective view of the channel member illustrated in FIG. 7 having a gate attached thereto in the stored position, in accordance with the present invention.
Figure 13:
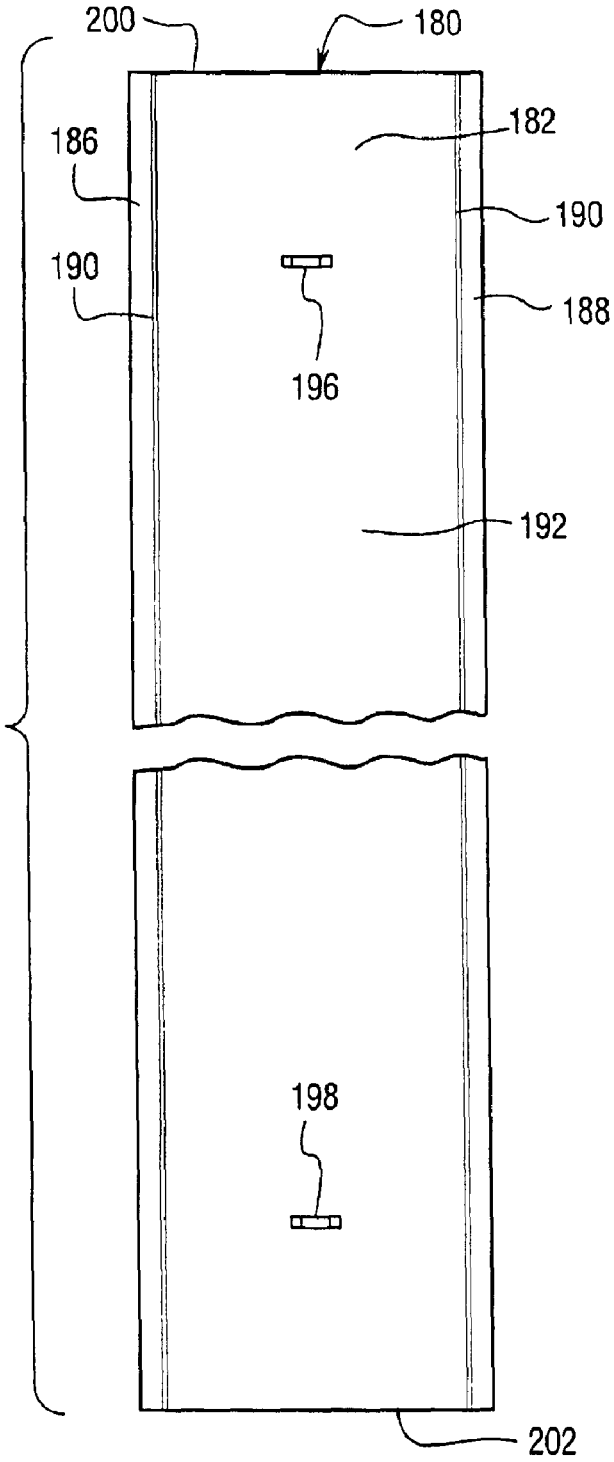
FIG. 13 is a partial, front view of the cover, in accordance with the present invention.
Figure 14:
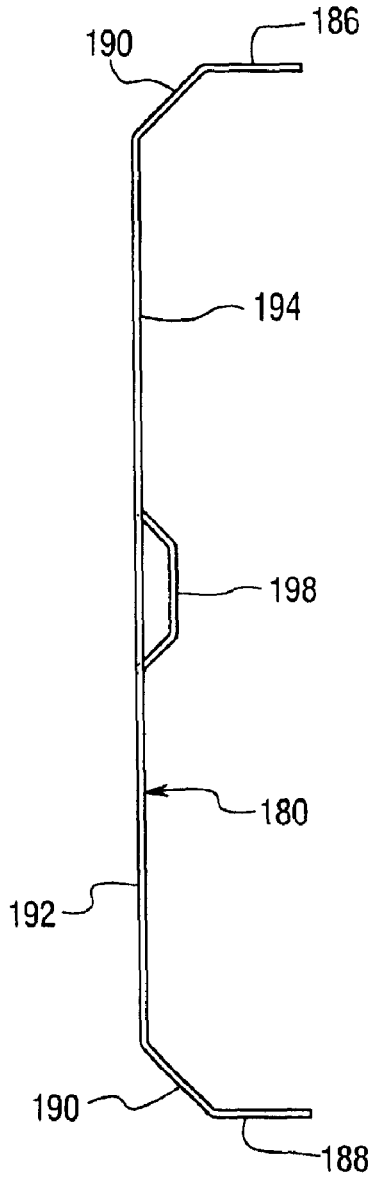
FIG. 14 is a bottom view of the cover illustrated in FIG. 13.
Figure 15:
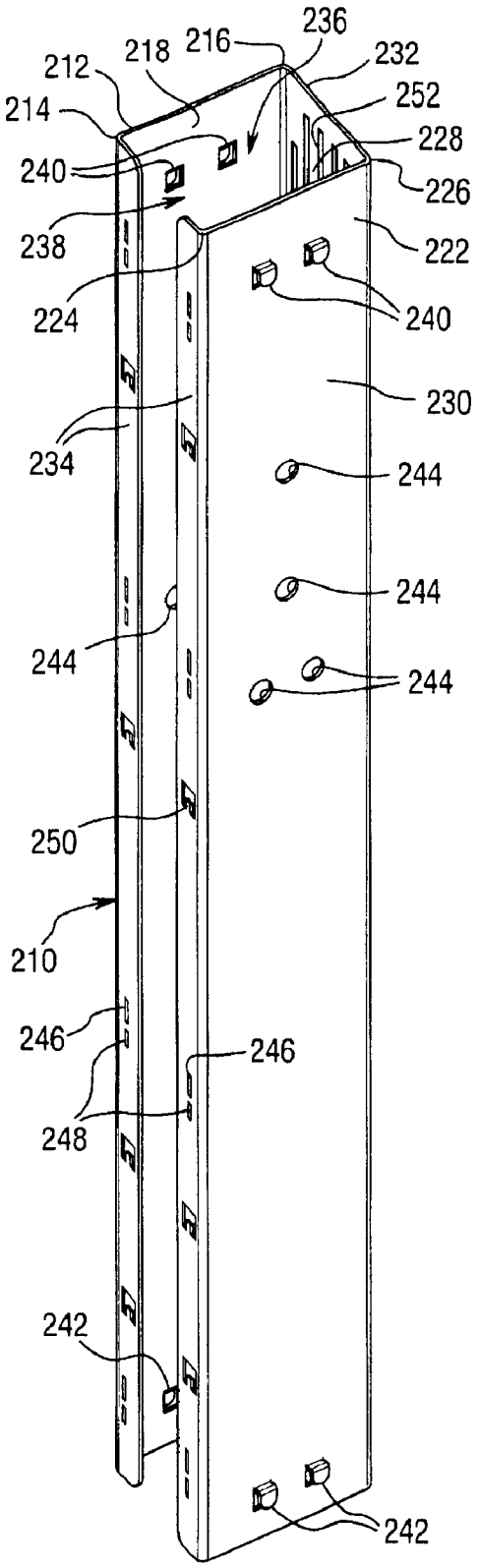
FIG. 15 is a top, front, side perspective view of a second embodiment of a channel member, in accordance with the present invention.
Figure 16:
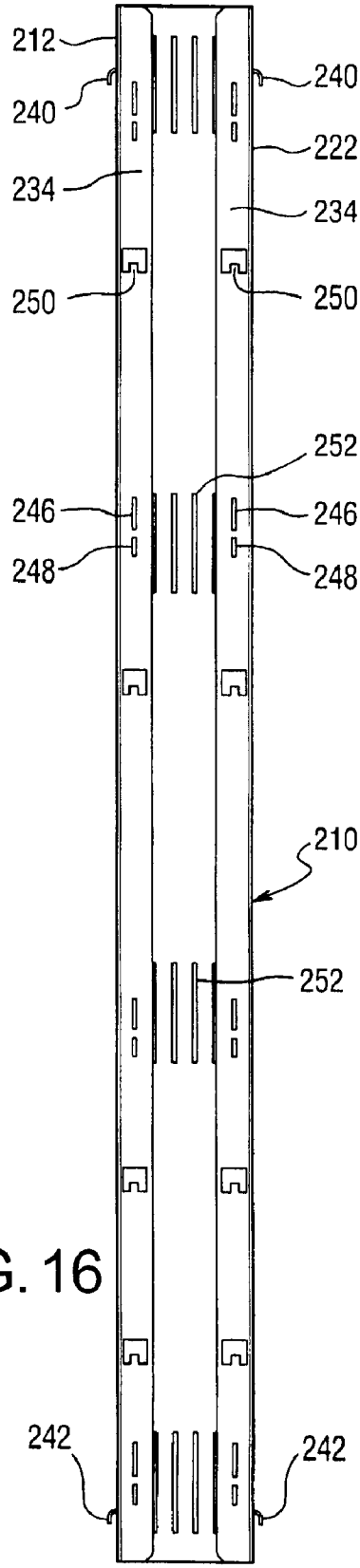
FIG. 16 is a front view of the channel member illustrated in FIG. 15.
Figure 17:
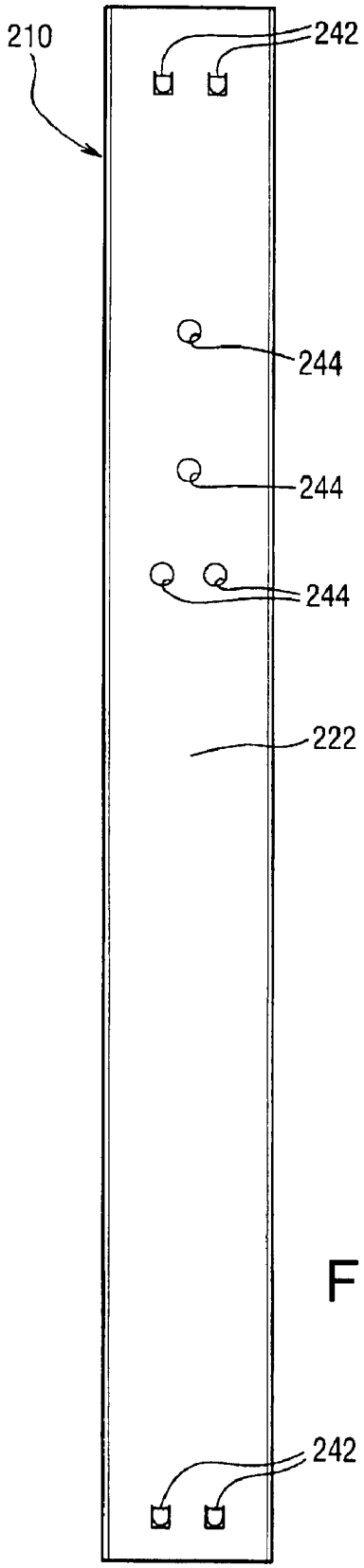
FIG. 17 is a side view of the channel member illustrated in FIG. 15.
Figure 18:
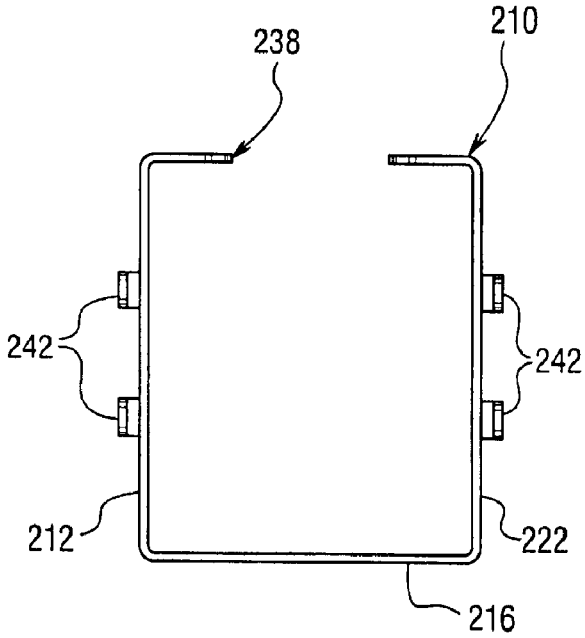
FIG. 18 is a bottom view of the channel member illustrated in FIG. 15.

A lance or hanging element 144 for storing gates 140 onto Z-channel member 60 extends outwardly from left end wall 142. Specifically, lance element 144 engages tongue elements 114 of Z-channel member 60. Lance element 144 is preferably formed by punching out a section from left end member 144, as seen in FIG. 11. Tongue elements 114 allow a plurality of gates 140 to be stored on Z-channel member 60 by hanging each lance element 144 on a corresponding tongue element 114, as seen in FIG. 12. Storage of the gates 140 facilitates the loading, managing, and rearranging of wires 12. Specifically, gates 140 obstruct access to openings 91 and 93 of first and second receiving areas 90 and 92 of Z-channel member 60, thus by removing gates 140 the operator gains easy access to receiving areas 90 and 92 through openings 91 and 93 allowing the operator to load and organize wires 12. In addition, tongue elements 114 provide a convenient place for the operator to store gates 140 while loading and organizing wires 12. Upon completion of loading and organizing wires 12 within first and second areas 90 and 92, the operator needs only to retrieve gates 140 from their storage positions and mount them back onto Z-channel member 60 to hold in wires 12. It will be understood that only one tongue element 114 is necessary and that the entire design of gates 140 eliminates the need for any additional fasteners in either mounting or storing gates 140 on Z-channel member 60 or in receiving cover 180, as discussed below.

Cable management assembly 10 also includes covers 180 for providing enhanced aesthetics mounted to gates 140, as seen in FIGS. 1-14. Cover 180 has a main body portion 182 that is substantially the same length as channel member 60. Main body portion 182 includes left and right sidewalls 186 and 188 connected to main body portion 182 by beveled edge walls 190, and front and back surfaces 192 and 194. Top and bottom lance or mounting elements 196 and 198 are disposed on main body portion 182 and allow easy mounting and removal of cover 180 from gates 140. Lance element 196 is located proximate top end 200 of cover 180 and bottom lance element 198 is located proximate bottom end 202 of cover 180. As seen in FIG. 6, lance elements 196 and 198 engage corresponding tongue elements 156 of gates 140 to mount cover 180 onto gates 140. Specifically, top lance element 196 is hung on tongue element 156 of a first gate 140 and bottom lance element 198 is hung on tongue element 156 of a second gate 140. Lance elements 196 and 198 are preferably formed by punching out a small section of main body portion 182. By forming lance elements integrally with main body portion 182, the need for additional fasteners to mount cover 180 is eliminated thus reducing costs in making and using covers 180.

FIGS. 15-18 show a second embodiment of a channel member to be employed with rack 20, C-channel member 210. C-channel member 210 includes left member 212, right member 222, and middle member 232. Left or first member 212 has front end 214, rear end 216, and inner and outer surfaces 218, 220. Right or second member 222 has front end 224, rear end 226, and inner and outer surfaces 228 and 230. Middle member 232 connects back end 216 of left member 212 and back end 226 of right member 222 such that the cross section, a section transverse to the longitudinal axis of C-channel member 210, is C-shaped. Front wall or surface 234 extends from front end 214 of left member 212 and front end 224 of right member 220 opposite middle member 232. Front walls 234 extend the length of C-channel member 210 and are substantially perpendicular to left and right portions 212 and 222, respectively. Left, right, and middle member 212, 222, and 232 and front walls 234 form an inner receiving area 236 for holding wires 12. Front walls 234 define front opening 238 therebetween where front opening 238 provides access to inner receiving area 228 to load or organize wires 12 therein.

Top and bottom integral clips 240 and 242 are formed in C-channel member in substantially the same fashion as integral clips 100 and 102 as discussed above with respect to Z-channel member 60. In addition, the C-shaped design of C-channel member 210 allows clips 240 and 242 to be disposed on both left and right member 212 and 222 and requires only one mold to form C-channel member 210. Pairs of top clips 240 are disposed on each left and right member 212 and 222 proximate the top of C-channel member 210. Pairs of bottom clips 242 are disposed on each left and right member 212 and 222 proximate the bottom of C-channel member. It will be understood that any number of clips 240 and 242 can be used as long as they correspond to mating holes 44 on rack 20.

C-channel member and clips 240 and 242 engage rack 20 in the same manner as Z-channel member and clips 100 and 102 such that one C-channel member can be mounted on either left or right portion 22 and 28 of rack 20. When mounted in a first position on right portion 28, outer surface 230 of left member 212 is adjacent outer surface 32 of right portion 28 and front opening 238 faces forwardly. When mounted in a second position on left portion 22, outer surface 230 of right member 222 is adjacent outer surface 26 of left member 22 and front opening 238 faces forwardly. Mating holes or fastening elements 244 for providing additional means for securing C-channel member 210 on rack 20, are disposed on left and right members 212 and 222 and correspond to mating holes 44 on rack 20 such that mating holes 44 and mating holes 244 can be coupled using a typical fastener such as a nut and bolt.

Front walls 234 include corresponding pairs of first and second slots 246 and 248 for receiving first and second foot members 150 and 152 of gates 140 in a fashion substantially similar to first and second receiving slots 110 and 112 of S-channel member 60. Gates 140 serve to enclose wires 12 in inner receiving area 236 in the same manner as discussed above with respect to first and second receiving areas 90 and 92 of Z-channel member 60. Slots 246 and 248 are generally evenly dispersed along front walls 234 but can be located anywhere along front walls 234 as long as corresponding pairs of slots are disposed on each front wall 234, respectively. Front walls 234 further include tongue or engaging elements 250 for storing gates 140, in the same fashion as discussed above with respect to tongue elements 114. Tongue elements 250 are also evenly dispersed along front wall 234, however, they can be located anywhere along front walls 234. It will be understood that only one pair of slots 246 and 248 and only one tongue element 250 is necessary for mounting and storing gates 140. Covers 180 can be used with C-channel member 210 in the same manner as discussed above with respect to S-channel member 60.

Middle member 232 includes elongated slots 252 for receiving straps for bundling and managing wires 12 in inner receiving area 236. C-channel is preferable formed of metal material but can be formed of a lighter weight material such as plastic. Also, C-channel 210 and Z-channel 60 can be used together on the same rack 22 or ganged together or used separately.

While a particular embodiment has been chosen to illustrate the invention, it will be understood by those skilled in the art that various changes and modifications can be made therein without departing from the scope of the invention as defined in the appended claims.

What is claimed is:

1. A channel member for managing wires, comprising:

a first member having a first surface, a second surface, and a plurality of first fastening elements;

an opposing, second member having a third surface, a fourth surface, and a plurality of second fastening elements, said third surface of said second member being planar with said first surface of said first member, and said fourth surface of said second member being planar with said second surface of said first member; and a middle member connecting said second surface of said first member to said third surface of said second member forming a Z-shaped section transverse to a longitudinal axis of said first and second members, said middle member defining first and second receiving areas between said first and second members and having an aperture for providing access between said first and second receiving areas, whereby a wire can be received concurrently in both said first and second receiving areas.

2. A channel member according to claim 1, wherein said first member a one-piece, unitary member and said first fastening elements include an integral clip extending from said first member.

3. A channel member according to claim 1, wherein said second member a one-piece, unitary member and said second fastening elements include a mating hole on said second member.

4. A channel member according to claim 1, wherein said first fastening elements include a plurality of first and second slots located on said first and second surfaces and said second fastening elements include a plurality of first and second slots located on said third and fourth surfaces.

5. A channel member according to claim 1, wherein said second surface of said first member includes a hanging element for storing a bracket.

6. A channel member according to claim 5, wherein said third surface include a hanging element.

7. A channel member according to claim 1, wherein said middle member includes a plurality of apertures.

8. A channel member according to claim 1, wherein said middle member includes a plurality of elongated slots for receiving straps.

9. A rack assembly, comprising:

a channel member for managing wires having, a one-piece first member with a first surface, a second surface, and an integral fastening element, an opposing, second member with a third surface and a fourth surface, said third surface of said second member being planar with said first surface of said first member, and said fourth surface of said second member being planar with said second surface of said first member, and a middle member connecting said first member to said second member forming first and second receiving areas between said first and second members; and a frame for supporting said channel member, said frame having a support element engaging said integral fastening element of said first member to support said channel member adjacent said frame.

10. A rack assembly according to claim 9, wherein said middle member connects said second surface of said first member to said third surface of said second member forming a Z-shaped section transverse to a longitudinal axis of said first and second members.

11. A rack assembly according to claim 9, wherein said middle member includes an aperture providing access between said first and second receiving areas, whereby a wire can be received concurrently in both said first and second receiving areas.

12. A rack assembly according to claim 9, wherein said integral fastening member of said first member is a clip extending from said first member and said support element of said frame is a mating hole receiving said clip.

13. A rack assembly according to claim 12, wherein said first member includes a plurality of clips and said frame includes a plurality of mating holes.

14. A rack assembly according to claim 9, wherein said second member is a one-piece, unitary member and includes an integral fastening element.

15. A rack assembly according to claim 14, wherein said integral fastening element of said second member is a mating hole.

16. A rack assembly according to claim 9, wherein each of said first surface of said first member and said third surface of said second member include a slot for receiving a bracket.

17. A rack assembly according to claim 16, further comprising:

a bracket with opposing ends, said ends engaging said slots of said first and third surfaces.

18. A rack assembly according to claim 17, wherein said bracket includes a cover receiving element for supporting a cover.

19. A rack assembly according to claim 18, further comprising:

a cover for covering wires within said channel member, said cover having a mounting element, said mounting element engaging said cover receiving element of said bracket to position said cover adjacent said bracket.

20. A rack assembly, comprising:

a first channel member for managing wires having, a one-piece first member with a first surface, a second surface, and an integral first fastening element extending from said first member, an opposing, second member with a third surface, a fourth surface, and a second fastening element for engaging a cooperating first fastening element of a second channel member, said third surface of said second member being planar with said first surface of said first member, and said fourth surface of said second member being planar with said second surface of said first member, and a middle member connecting said first member to said second member forming first and second receiving areas between said first and second members, and having an aperture for providing access between said first and second receiving areas; and a frame for supporting said first channel member, said frame having a support element engaging said first integral fastening element of said first member to support said first channel member adjacent said frame, whereby a wire can be received concurrently in both said first and second receiving areas of said first channel member.

21. A rack assembly according to claim 20, further comprising:

a second channel member having a first fastening element and said second fastening element of said first channel member engages said first fastening element of said second channel member whereby said second channel member is positioned adjacent to and supported by said first channel member.

22. A rack assembly according to claim 21, wherein said support element of said frame is a first hole, said integral first fastening element of said first channel member is a clip extending into said first hole, said second fastening element of said first channel member is a second hole, and said first fastening element of said second channel member is a clip extending into said second hole.

23. A rack assembly according to claim 21, wherein said first and second channel members are substantially identical.

24. A method for managing wires, comprising the steps of:

providing a bracket having opposing ends and a hanging element, and a channel member having an area for holding wires, fastening elements for receiving the ends of the bracket, and an engaging element for receiving the hanging element of the bracket;

storing the bracket on the channel member in a stored position such that the hanging element of the bracket is coupled to the engaging element of the channel member;

accessing the area for holding wires in the channel member;

removing the bracket from the stored position; and placing the bracket back on the channel member to hold the wires in the channel member such that the ends of the bracket are engaged with the fastening elements of the channel member.

25. A method for managing wires according to claim 24, further comprising the steps of:

removing the bracket from the channel member by disengaging the ends of the bracket from the fasteners of the channel member;

storing the bracket on the channel member in the stored position;

accessing the area for holding wires in the channel member;

removing the bracket from the stored position; and placing the bracket back on the channel member to hold the wires in the channel member such that the ends of the bracket are engaged with the fasteners of the channel member.

26. The method for managing wires according to claim 25, wherein the step of accessing the area for holding the wires in the channel member includes loading wires into to the area.

27. The method for managing wires according to claim 25, wherein the step of accessing the area for holding the wires in the channel member includes rearranging wires in the area.

*28. A channel member for managing wires, comprising:*

*a first member having opposing inner and outer surfaces and a plurality of first fastening elements extending from said outer surface of said first member and connectable to a first frame, and a first wall extending from said first member;*

*a second member having opposing inner and outer surfaces and a plurality of second fastening elements located on said outer surface and connectable to a second frame, said inner surface of said second member facing said inner surface of said first member, and a second wall extending from said second member; and*

*a middle member connecting said first and second members and forming a receiving area between said first and second members for receiving the wires;*

*said first wall extending from said first member in a direction toward said second member and said second wall extending from said second member toward said first member, said first wall and second wall defining an opening providing access to said receiving area.*

*29. A channel member for managing wires according to claim 28, wherein*

*each of said first and second members is a substantially planar wall; and*

*said middle member is a substantially planar wall.*

*30. A channel member for managing wires according to claim 28, wherein*

*said first fastening element is a clip.*

*31. A channel member for managing wires according to claim 28, wherein*

*each of said first and second walls includes third and fourth fastening elements, respectively, that receive a bracket.*

*32. A channel member for managing wires according to claim 31, wherein*

*each of said third and fourth fastening elements is a slot.*

*33. A rack assembly, comprising:*

*a first channel member including,*

*a first member having opposing inner and outer surfaces and a first fastening element extending from said outer surface of said first member,*

*a second member having opposing inner and outer surfaces and a second fastening element located on said outer surface, said inner surface of said second member facing said inner surface of said first member, and*

*a middle member connecting said first and second members and forming a receiving area between said first and second members for receiving wires;*

*a second channel member including a first member having opposing inner and outer surfaces and at least one fastening element extending from said outer surface of said first member, and said fastening element of said second channel member being engagable with said second fastening element of said first channel; and*

*a frame supporting said first channel member, said frame having a support element engagable with said first fastening element of said first member to support said first channel member adjacent said frame.*

*34. A rack assembly according to claim 33, wherein*

*said fastening element of said second channel member is substantially the same as the first fastening element of said first fastening element of said first channel member.*

*35. A rack assembly according to claim 34, wherein*

*each of said first fastening element of said first channel member and said fastening element of said second channel member, respectively, is a clip.*

*36. A rack assembly according to claim 35, wherein*

*said second fastening element of said first channel member is a hole; and*

*said clip of said second channel member is received in said hole of said first channel member.*

*37. A rack assembly according to claim 36, wherein*

*said frame includes a hole; and*

*said clip of said first channel member is received in said hole of said frame.*

*38. A rack assembly, comprising:*

*a channel member for managing wires having,*

*a first member and an opposing second member, each of said first and second members, respectively, having a plurality of fastening elements extending therefrom,*

*a first wall extending from said first member toward said second member;*

*a second wall extending from said second member toward said first member and forming a front surface, and*

*a middle member connecting said first member to said second member, and*

*said middle, first, and second members and said first and second walls defining a receiving area for holding wires and an opening for accessing said receiving area; and*

*a frame for supporting said channel member, said frame having a support element engaging said fastening element of said first member to support said channel member adjacent said frame.*

*39. A rack assembly according to claim 38, wherein*

*said support element engages said fastening element of said first member in a first position of said channel member and said support element engages said fastening element of said second member in a second position of said channel member.*

*40. A rack assembly according to claim 38, wherein*

*said fastening elements are clips integral with each of said first and second members, respectively, and extending therefrom; and*

*said support element is a mating hole.*

*41. A rack assembly according to claim 38, wherein*

*each of said front surfaces of said first and second members include a slot for receiving a bracket as well as a hanging element for storing a bracket.*

*42. A channel member according to claim 38, wherein*

*said middle member is substantially perpendicular to said first member and said second member.*

*43. A channel member according to claim 38, wherein*

*said first member has a first longitudinal side edge and a second longitudinal side edge, and*

*said second member has a first longitudinal side edge and a second longitudinal side edge.*

*44. A channel member according to claim 43, wherein*

*said first longitudinal side edge of said first member and said second member define a front edge of said first member and said second member respectively.*

*45. A channel member according to claim 43, wherein*

*said middle member extends between said first longitudinal side edge of said first member and said second longitudinal side edge of said second member.*

*46. A channel member according to claim 43, wherein*

*said middle member extends between said first longitudinal side edge of said first member and said first longitudinal side edge of said second member.*

*47. A channel member according to claim 43, wherein*

*said middle member extends between said first wall of said first member and said first wall of said second member.*

*48. A rack assembly according to claim 33, wherein*

*said middle member is substantially perpendicular to said first member and said second member.*

*49. A rack assembly according to claim 33, wherein*

*said first member has a first longitudinal side edge and a second longitudinal side edge, and*

*said second member has a first longitudinal side edge and a second longitudinal side edge.*

*50. A rack assembly according to claim 49, wherein*

*said middle member extends between said first longitudinal side edge of said first member and said second longitudinal side edge of said second member.*

*51. A rack assembly according to claim 49, wherein*

*said middle member extends between said first longitudinal side edge of said first member and said first longitudinal side edge of said second member.*

*52. A rack assembly according to claim 49, wherein*

*said first member includes a front wall forming said first longitudinal side edge and a rear wall forming said second longitudinal side edge;*

*said second member includes a front wall forming said first longitudinal side edge and a rear wall forming said second longitudinal side edge, and*

*said middle member extends between said front wall of said first member and said rear wall of said second member.*

*53. A rack assembly according to claim 49, wherein*

*said first member includes a front wall at said first longitudinal side edge;*

*said second member includes a front wall at said first longitudinal side edge; and*

*said middle member extends between said second longitudinal side edge of said first member and said second longitudinal side edge of said second member.*

* * * * *